United States Patent [19]

Nishiyama et al.

[11] Patent Number: 4,837,626

[45] Date of Patent: Jun. 6, 1989

[54] CONTROLLER FOR CRT DISPLAY APPARATUS

[75] Inventors: Mikio Nishiyama; Taizo Akimoto, both of Kanagawa, Japan

[73] Assignee: Fuji Photo Film Co., Ltd., Kanagawa, Japan

[21] Appl. No.: 103,636

[22] Filed: Oct. 2, 1987

[30] Foreign Application Priority Data

Oct. 2, 1986 [JP] Japan ................................. 61-235377

[51] Int. Cl.$^4$ .......................... H04N 5/262; H04N 5/08
[52] U.S. Cl. ..................................... 358/183; 358/111; 358/140; 358/153
[58] Field of Search ............... 358/140, 181, 183, 160, 358/111, 153; 378/99; 340/723

[56] References Cited

U.S. PATENT DOCUMENTS

| 4,644,395 | 2/1987 | Itou et al. ........................ 358/140 X |
| 4,698,674 | 10/1987 | Bloom .................................. 358/140 |
| 4,719,644 | 1/1988 | Herzog et al. ................... 358/140 X |

Primary Examiner—James J. Groody
Assistant Examiner—Victor R. Kostak
Attorney, Agent, or Firm—Sughrue, Mion, Zinn, Macpeak, and Seas

[57] ABSTRACT

A controller for a CRT display apparatus which is capable of displaying an image selectively either in an interlace mode or in a non-interlace mode and which has a function for displaying the image in raster erase mode. The controller has a field detection circuit capable of judging whether the present mode is the interlace mode or the non-interlace mode, and a mode setting circuit allowing the CRT display apparatus to display the image in the raster erase mode which is changed so as to match the interlace display mode or in the non-interlace display mode switched over therebetween in accordance with the result of judgment conducted by said field detection circuit. In consequence, raster erase matching with the selected display mode can be selected and effected automatically.

16 Claims, 7 Drawing Sheets

ODD-NUMBER FIELD

EVEN-NUMBER FIELD

CONTROLLER FOR CRT DISPLAY APPARATUS

BACKGROUND OF THE INVENTION

1. Field of the Invention

The present invention relates to a controller for a CRT display apparatus and, more particularly, to a controller for a CRT display apparatus of raster scan type.

2. Description of the Related Art

In a conventional medical field, X-ray photographs have been taken or X-ray image displayed on a fluorescent plate have been observed by physicians for diagnostic purposes, which results in exposure of the physicians to X-ray. In recent years, therefore, it is becoming a common measure to use an X-ray TV display apparatus so as to enable physicians to diagnose the object without any risk of exposure to X-ray. Such an X-ray display apparatus is usually constructed such as to record any image which the physician needs by photographing the image by a camera.

The CRT used in this apparatus is of a raster scan type, so that a problem is encountered that the image on the CRT photographed by the camera often contains clear scanning lines. To obviate this problem, it has been proposed to use a CRT display apparatus capable of displaying the image in raster erase mode in which the number of the raster scanning lines are increased by shifting them vertically to scan the gaps between the adjacent scanning lines, so that the scanning lines are obscured.

Computer-aided diagnostic X-ray system, referred to as CT (Computer Tomography), has also been known. In this type of diagnostic system, the image on the CRT tends to flicker by light. In some cases, therefore, the system is so designed that, when the image on the CRT is to be photographed by a camera, the image is displayed in so-called interlace mode in which the vertical scan is conducted such as to skip over every other scanning line, whereas, when photographing is not necessary, the image is displayed in non-interlace mode in which skipping of scanning line is not conducted.

A system called "digital subtraction system" has been developed in recent years and is expected to have a variety of use. This system is, for example, used for a X-ray TV system adapted to pick up any difference among a plurality of image data so as to display only the necessary image. This system is used to display images of various diagnostic objects including comparatively still objects, e.g., the head of a patient and comparatively moving objects such as the heart of a patient. In the medical diagnosis conducted with this type of system, therefore, the spatial resolution and temporal movement of the image have great significance. The most influential factor is the resolution of the image pickup device of the X-ray TV system. In particular, an improvement in the S/N ratio is very important. The improvement in the S/N ratio, however, is incompatible with the movement of the object to be diagnosed. In order to overcome this problem, it has been proposed to select a slow-speed scan mode or a high-speed scan mode, depending on whether the movement of the object to be diagnosed is large or not. Namely, when the object is comparatively still, the slow-speed scan mode is adopted so that the scanning is conducted at a comparatively low rate, e.g., 7.5 fields per second thereby increasing the S/N ratio. In this case, the object image is read with $1024 \times 1024$ pixels, and is displayed in interlace of 1024, thus attaining a high spatial resolution. In contrast, when the movement of the object is comparatively large, the high-speed scan mode is adopted in which the scanning is conducted at a comparatively high rate of, for example, 30 fields per second. In this case, the object image is read with $512 \times 512$ pixels, and is displayed in non-interlace of 512, thereby facilitating the observation of movement of the object. Thus, a single diagnostic system produces both an image signal for interlace mode display and an image signal for non-interlace mode display.

This causes a problem particularly in CRT display apparatus designed to display images selectively in interlace mode and non-interlace mode and having a function for displaying the image in raster erase mode mentioned before. Namely, in such CRT display apparatus, it is necessary to switch the operation mode between the interlace raster erase mode and the non-interlace raster erase mode. Conventionally, this switching of operation mode has been conducted manually by an operator through manipulating switches on the camera and the CRT.

This manual switching operation is rather laborious and complicated and, therefore, it has often been experienced that photographs of inferior resolution are obtained due to incorrect switching operation.

SUMMARY OF THE INVENTION

Accordingly, an object of the present invention is to provide a controller for a CRT display apparatus which is automatically switching the operation mode of the CRT between the interlace display mode and the non-interlace display mode upon detection of the mode of the input image signal, and also capable of automatically changing the operation mode to the raster erase mode suitable for the selected display mode, thereby overcoming the above-described problems of the related art.

To this end, according to one aspect of the present invention, there is provided a controller for a CRT display apparatus which is capable of displaying, in accordance with an input image signal, an image selectively either in an interlace mode in which a vertical scanning is conducted in such a manner as to skip over every other scanning line or in a non-interlace display mode in which the vertical scanning is effected without skipping over any scanning line, and which is capable of displaying the image in raster erase mode in which rasters are shifted vertically to scan the gap between adjacent scanning lines, the controller comprising: separation means for separating vertical synchronizing pulses and horizontal synchronizing pulses from the input image signal; judging means for judging, on the basis of the separated vertical and horizontal synchronizing pulses, whether the present mode is the interlace display mode or the non-interlace display mode; and control means for allowing said CRT display apparatus to display the image of said input image signal in said raster erase mode which is changed so as to match with the interlace display mode or the non-interlace display mode switched over therebetween in accordance with the result of the judgment conducted by said judging means.

According to the invention, the vertical synchronizing pulses and the horizontal synchronizing pulses are separated from the image signal by the operation of the separating means. The separated vertical synchronizing pulses and horizontal synchronizing pulses are input to the judging means which judges, from the input synchronizing pulses, whether the present mode is the interlace display mode or the interlace display mode. In the interlace display mode, each frame is divided into two fields: namely, an odd-number field in which the scanning is commenced at the left end of the uppermost position of the CRT and an even-number field in which the scanning is commenced at a position which is horizontally offset by an amount H/2 (H represents interval of horizontal scan) from the point at which the scanning for the odd number field is commenced. The vertical synchronizing pulses and the horizontal synchronizing pulses of the odd number field have phase offset of H/2 from those of the even-number field. It is therefore possible to judge whether the present mode is the interlace mode or the non-interlace mode, on the basis of the vertical synchronizing pulses and horizontal synchronizing pulses. The control means then switches the display mode either to the interlace display mode or to the non-interlace display mode, in accordance with the result of judgment conducted by the judging means. Consequently, the display mode is automatically switched over between the interlace display mode and the non-interlace display mode and, in addition, the raster erase mode for the interlace display mode or the raster erase mode for the non-interlace display mode is automatically selected, thus eliminating any risk for the erroneous switching operation which is inevitable in the conventional manual switching operation.

Thus, the controller of the invention enables the raster erase mode to be automatically changed in accordance with either the interlace display mode or the non-interlace display mode switched over, whereby the raster erase matching with the present display mode can be effected automatically.

The above and other objects, features and advantages of the present invention will become clear from the following description of the preferred embodiments when the same is read in conjunction with the accompanying drawings.

BRIEF DESCRIPTION OF THE DRAWINGS

FIG. (8A) is a diagram showing the movement of the scanning line of an odd-number field.

DESCRIPTION OF THE PREFERRED EMBODIMENTS

Preferred embodiments of the present invention will be described hereinunder with reference to the accompanying drawings.

Figure 1:
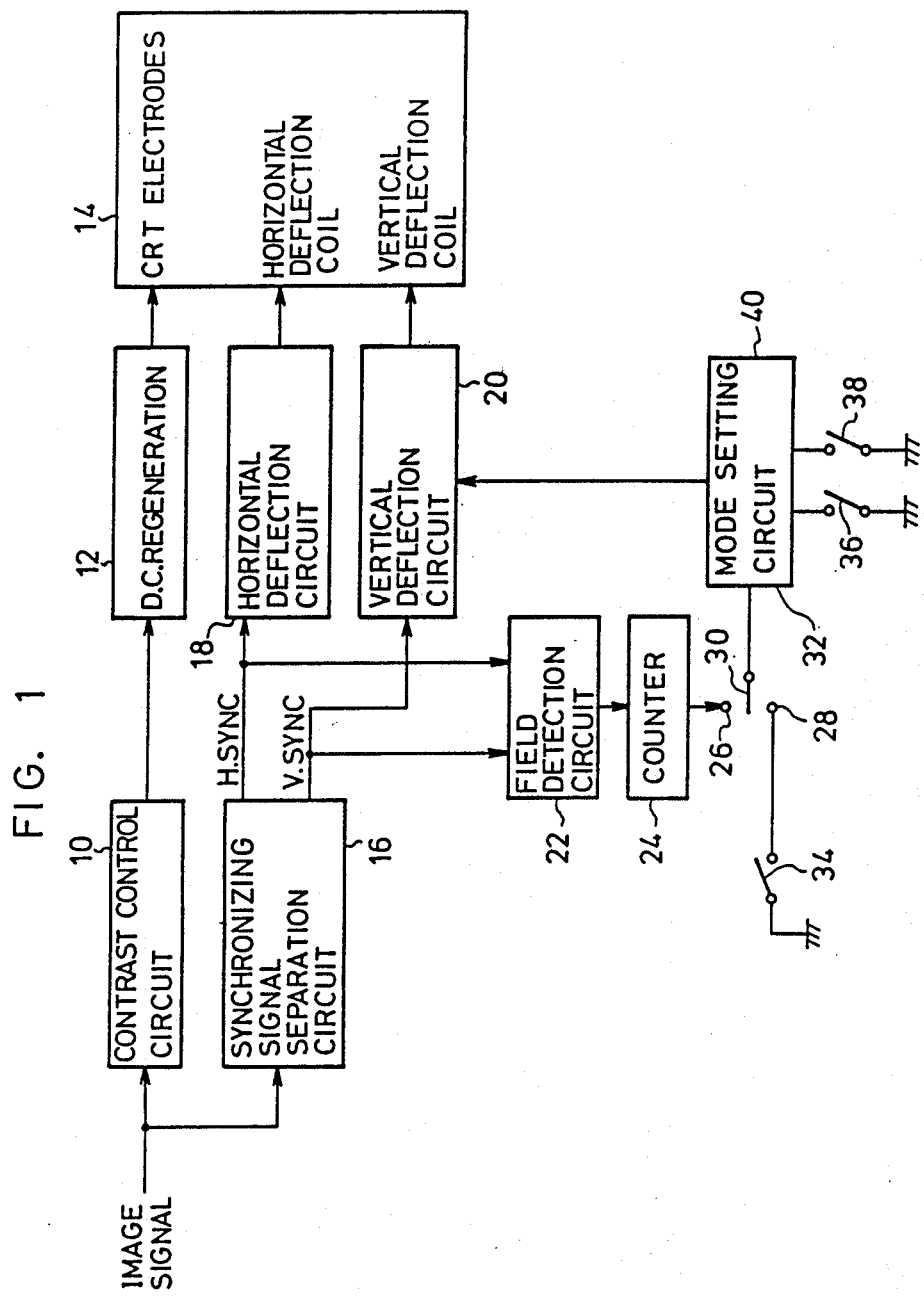
FIG. 1 is a block diagram of an embodiment of the present invention.

Referring first to FIG. 1 which is a block diagram of a first embodiment of the controller in accordance with the present invention, an image signal is input to the CRT electrodes (grid) of a CRT display system 14, through a contrast control circuit 10 and a brightness controlling D.C. regenerating circuit 12. The contrast and the brightness of the CRT image are controlled by the contrast control circuit 10 and the D.C. regenerating circuit 12. The image signals also are input to a synchronizing pulse separating circuit 16 which is adapted to separate vertical synchronizing pulses V.SYNC and horizontal synchronizing pulses H.SYNC. The horizontal synchronizing pulses H.SYNC separated by the separating circuit 16 are delivered, through a horizontal deflection circuit 18, to a horizontal deflection coil of the CRT display 14. The horizontal synchronizing pulses H.SYNC also are input to a field detection circuit 22. The vertical synchronizing pulses V.SYNC separated by the separating circuit 16 are delivered, through a vertical deflection circuit 18, to a vertical deflection coil of the CRT display 14. The vertical synchronizing pulses H.SYNC also are input to a field detection circuit 22. The field detection circuit 22 is connected to a change-over switch 32 through a retriggerable counter 24. The change-over switch 32 has an "automatic" terminal 26, a "manual" terminal 28 and a contactor 30. The "manual" terminal 28 is connected to a manually operable interlace/non-interlace change-over switch 34. The contactor 30 of the change-over switch 32 is connected to a mode setting circuit 40. An erase on-off switch ion 36 which allows the operator to selectively adopt the raster erase mode is connected to the mode setting circuit 40. To the mode setting circuit 40 also is connected an erase number selection switch 38 which enables the operator to select the increment in the number of the scanning lines when the raster erase is conducted. More specifically, it is possible to increase the number of the scanning lines four times and eight times as large, respectively, by turning on and off the erase number selection switch. The mode setting circuit 40 is connected to the vertical deflection circuit 20 so that the vertical synchronizing pulses are delayed successively by a predetermined amount or in accordance with a predetermined sequence thereby to effect the raster erase, in accordance with the states of the erase on-off switch 36 and the erase number selection switch 38.

Figure 2:
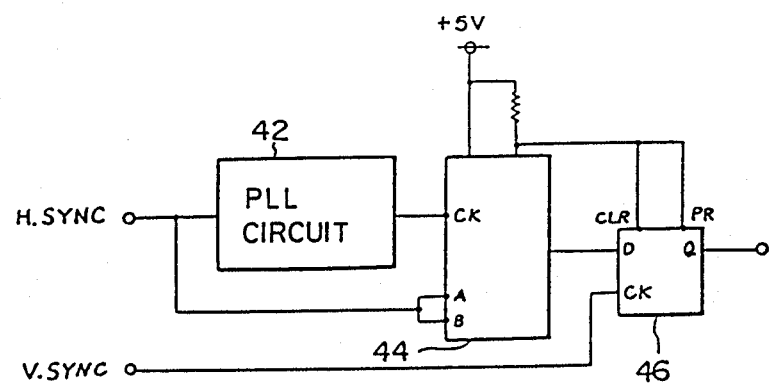
FIG. 2 is a block diagram showing the detail of a field detection circuit incorporated in the embodiment shown in FIG. 1.

The detail of the field detection circuit 22 will be explained with specific reference to FIG. 2. The field detection circuit 22 has the following circuit elements: a PLL circuit 42 adapted to receive the horizontal synchronizing pulses H.SYNC and to output a signal of a frequency which is a multiple of the frequency of the horizontal synchronizing pulses; a shift register having a clock terminal CK which receives the output of the PLL circuit 42 and A,B terminals for receiving the horizontal synchronizing pulses H.SYNC, and adapted to output the horizontal synchronizing pulses H.SYNC after delaying the same for a predetermined time; and a D-flip-flop 46 having a D-terminal for receiving the output from the shift register 44 and a clock terminal CK for receiving the vertical synchronizing pulses V.SYNC, and adapted to judge whether the image signal is of an odd-number field or an even-number field, depending on the level of the signal received by the D-terminal when the vertical synchronizing pulse V.SYNC is received. The D-flip-flop circuit 46 has a Q-terminal through which it delivers a judging signal concerning whether the image signal is of an odd-number or even-number field.

Figure 3:
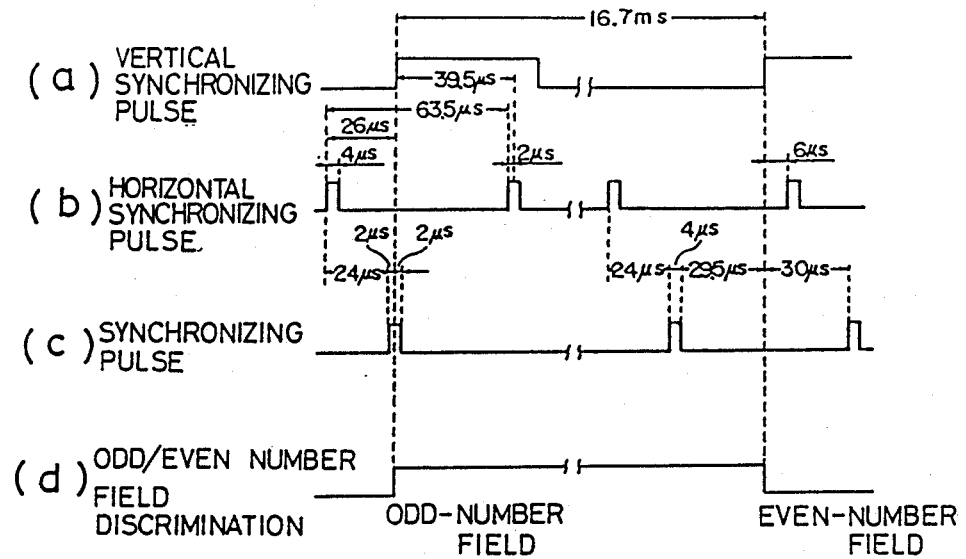
FIG. 3 is a waveform charts showing waveforms of various signals available at various portions of the embodiment.

FIG. 3 shows waveforms of signals including the vertical synchronizing pulse, horizontal synchronizing pulse, output of the shift register 44 and the output from the Q-terminal of the D-flip-flop 46. The signal waveforms as shown in FIG. 3 are obtained when the scanning is conducted over 525 scanning lines and at a field frequency of 60 Hz which corresponds to a frame frequency of 30 Hz, i.e., at the scanning rate of 525/60 Hz. As will be seen from this FIG., the level of the output from the Q-terminal of the D-flip-flop is high and low, respectively, when the image signal is of an odd-number field and of an even-number field. It is, therefore, possible to judge whether the present mode is the interlace mode, by counting the rise of fall of the output from the Q-terminal of the D-flip-flop 46 by means of the counter 24. In contrast, the level of the output from the Q-terminal of the D-flip-flop 46 does not change when the present mode is non-interlace mode. It is therefore possible to judge whether the present mode is non-interlace mode, by examining the output from the Q-terminal of the D-flip-flop 46.

Referring again to FIG. 1, in the operation of the first embodiment, the operator can manually set the operation mode in the interlace mode or the non-interlace mode, by attaining a manual mode through connecting the contactor 30 to the "manual" terminal 28 in the change-over switch 32 and then suitably turning on or off the interlace/non-interlace manual change-over switch 34. When the manual mode has been selected, the operator can select one of two modes, i.e., a mode in which the raster erase is conducted and a mode in which the raster erase is not conducted, by manipulating the erase on-off switch 36. When the raster image mode has been selected by the erase on-off switch 36, the operator can increase the number of the scanning lines by 4 or 8 times, by operating the erase number selection switch 38.

Figure 4:
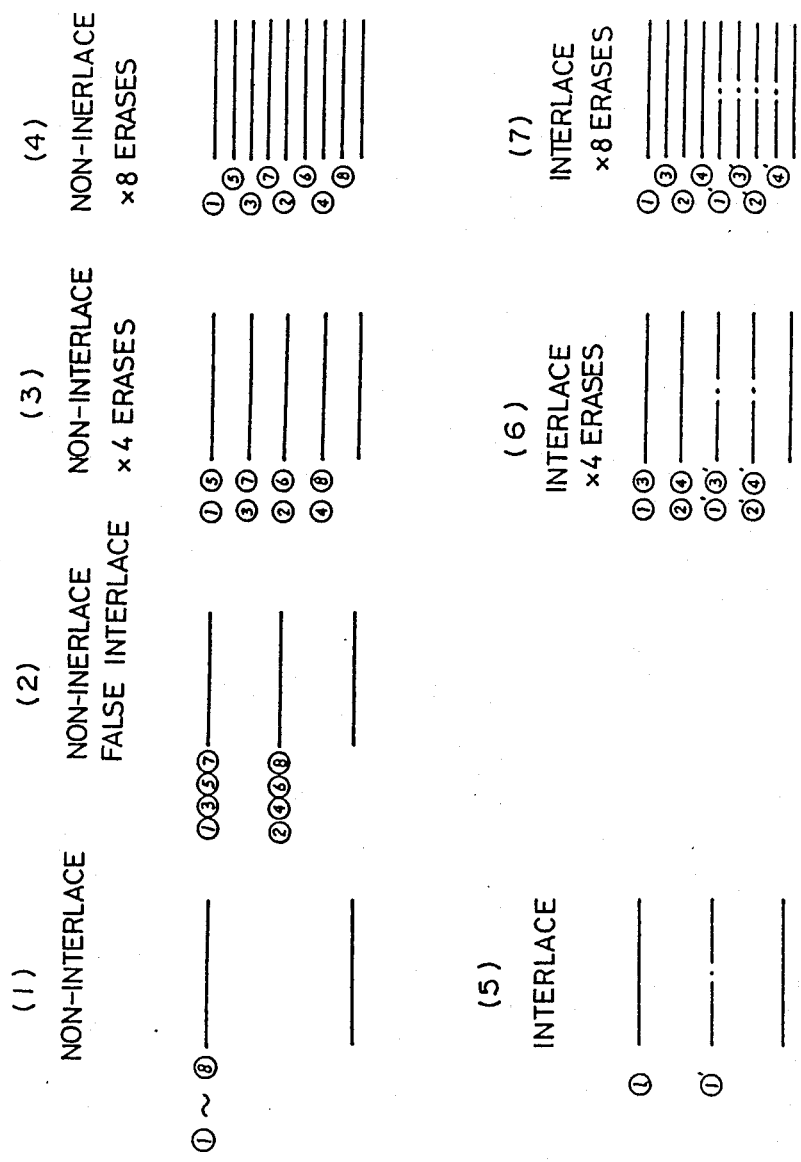
FIGS. 4(1) to 4(7) are diagrams showing the manner of change in the scanning line in the respective modes.

The manner in which the state of the scanning lines are changed by the described switching operation will be explained hereinunder with reference to FIGS. 4(1) to 4(7). Encircled numerals appearing in these figures show the order or sequence of the scan. More specifically, FIGS. 4(1) to 4(4) represent the scanning lines as obtained when the image signal is of non-interlace mode. When the image signal is directly input to the CRT display system 14, i.e., when the switch 34 is in the off position, scanning lines are obtained as shown in FIG. 4(1). When the interlace/noninterlace change-over switch 34 is turned on to select the interlace mode, i.e., when the switch 34 is turned on while the image signal is of non-interlace mode, the state of the scanning lines is changed as shown in FIG. 4(2). States of scanning lines as shown in FIGS. 4(3) and 4(4) are obtained when the number of the scanning lines is multiplied by 4 and 8, respectively, in the raster erase mode.

On the other hand, FIGS. 4(5) to 4(7) show the states of the scanning lines as obtained when the image signal is of interlace mode. More specifically, FIG. 4(5) shows the state of the scanning lines as obtained when the interlace/non-interlace manual change-over switch is turned on to select the interlace mode. States of scanning lines as shown in FIGS. 4(6) and 4(7) are obtained when the number of the scanning lines is multiplied by 4 and 8, respectively, in the raster erase mode.

When the contactor 30 of the change-over switch 32 is connected to the "automatic" terminal 26, the automatic setting mode is selected so that the setting of the mode in the mode setting circuit 40 is changed-over in the same manner as that effected by the manual operation of the interlace/non-interlace manual change-over switch. In this automatic setting mode, however, the switching of the mode between the interlace and non-interlace modes is conducted automatically in accordance with the result of judgment conducted by the field detection circuit 22 as to whether the present image signal is of the interlace mode or non-interlace mode. As a result, the display mode is switched between the interlace mode and the non-interlace mode in accordance with the mode of the image signal. In addition, the raster erase mode is changed in accordance with the selected display mode, provided that the erase number has been selected by manipulation of the erase on-off switch.

Figure 5:
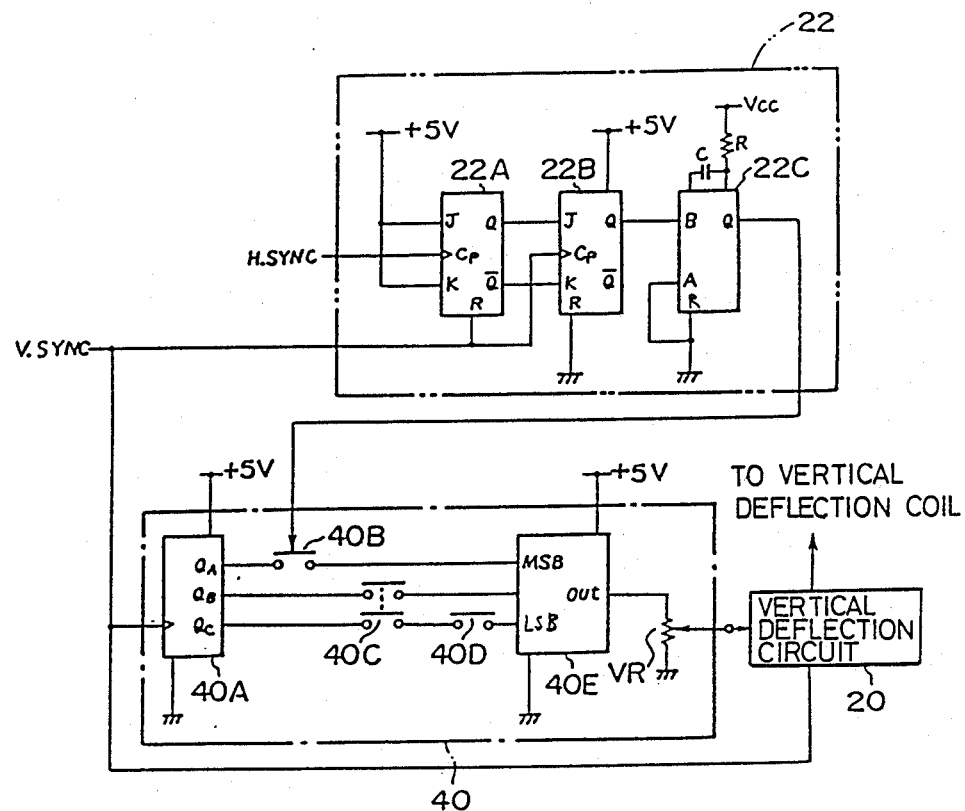
FIG. 5 is a block diagram of an essential portion of another embodiment of the present invention.

A second embodiment of the present invention will be described hereinunder with reference to FIG. 5. In FIG. 5, illustration of portions of the controller identical to those of the first embodiment shown in FIG. 1 is omitted, and the same reference numerals are used to denote portions corresponding to those in FIG. 1.

The field detection circuit 22 in this embodiment includes a J-K-flip-flop 22A, a J-K-flip-flop 22B and a monostable multivibrator 22C. A power supply of 5V is connected to the J- and K-terminals of the J-K-flip-flop 22A. The $C_P$ terminal of the J-K-flip-flop 22A receives the horizontal synchronizing pulses H.SYNC, while the R-terminal (reset terminal) of the J-K-flip-flop 22A receives the vertical synchronizing pulses V.SYNC. The Q-terminal of the J-K-flip-flop 22A is connected to the J-terminal of the J-K-flip-flop 22B, while the Q-terminal of the J-K-flip-flop 22A is connected to the K-terminal of the J-K-flip-flop 22B.

The J-K-flip-flop 22B has the $C_P$ terminal which receives the vertical synchronizing pulses V.SYNC and the R terminal which is grounded. A power supply of 5 V is connected to the R-terminal of the J-K-flip-flop 22B. The Q-terminal of the J-K-flip-flop 22B is connected to the B-terminal of the monostable multivibrator 22C. The monostable multivibrator 22C has an A-terminal which is grounded and a Q-terminal is connected in such a manner as to turn on and off the interlace setting switch 40B of the mode setting circuit 40. The monostable multivibrator 22C is connected through a capacitor C and a resistor R to a power supply $V_{cc}$.

The mode setting circuit 40 is provided with a digital-to-analog (D/A) converter 40E and a variable resistor VR. The counter 40A is provided with one input terminal and three output terminals QA, QB and QC. The input terminal of the counter 40A receives vertical synchronizing pulses, while the QA terminal of the counter 40A is connected to the uppermost bit (MSB) of the D/A converter 40E through the interlace/non-interlace setting switch 40B. The QB terminal of the counter 40A is connected to the D/A converter 40E through one of the contacts of an erase on-off switch 40C, while the QC terminal of the same is connected to the lowermost bit (LSB) of the D/A converter 40E through the other of the contacts of the erase on-off switch 40C and through an erase number selection switch 40D. To the output of the D/A converter 40E is connected the variable resistor VR which in turn is connected to the vertical deflection circuit 20. The variable resistor VR is beforehand adjusted such as to provide an output of 1H.

The operation of the second embodiment will be described hereinunder. As explained before, in the case of an image signal of the interlace mode, a phase difference of H/2 exists between the vertical and horizontal synchronizing pulses in an odd-number field and those in an even-number field. The field detection circuit 22, therefore, can discriminate whether the present mode of the image signal is the interlace mode or the non-interlace mode, on the basis of the vertical and horizontal synchronizing pulses. When the image signal is of the non-interlace mode, the interlace/non-interlace setting switch 40B is turned on, whereas, when the image signal is of the interlace mode, the interlace/non-interlace setting switch 40B is turned off.

The counter 40A conducts frequency-division or demultiplication of the vertical synchronizing pulses V.SYNC so that a signal of a frequency obtained through demultiplication into ½ corresponding to H/2 is derived from the QA terminal of the counter 40A. At the same time, a signal of a frequency obtained through demultiplication into ¼ corresponding to H/4 and a signal of a frequency obtained through demultiplication into ⅛ corresponding to H/8 are derived from the QB terminal and the QC terminal of the counter 40A, respectively. The D/A converter 40E converts the signal which is input thereto in accordance with the states of the interlace/non-interlace setting switch 40B, erase on-off switch 40C and the erase selection switch 40D, and delivers the vertical synchronizing pulses V.SYNC to the vertical deflection coil, through the variable resistor VR and the vertical deflection circuit 20.

Figure 6:
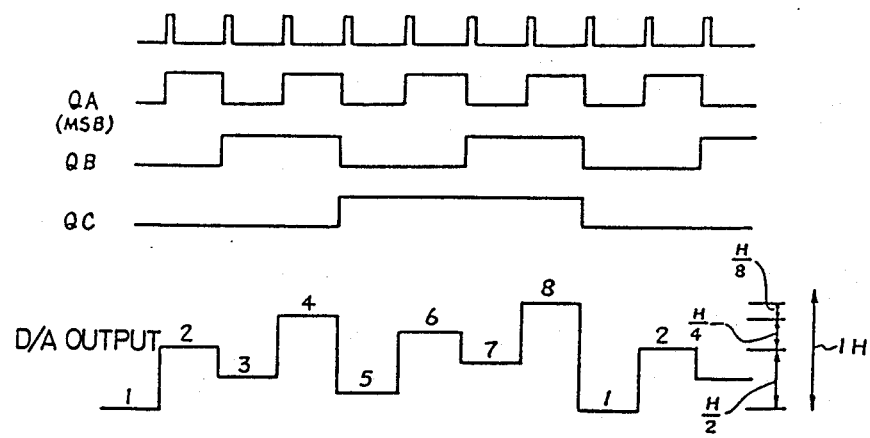
FIG. 6 is a diagram showing waveforms of signals obtained at various portions when raster erase is conducted with magnification 8 in non-interlace display mode.

A description will be made hereinunder as to the signal derived from the D/A converter 40E, with specific reference to FIGS. 6 and 7. Numerals appearing in these FIGS. represent the sequence or order of the scan. More specifically, FIG. 6 shows the output from the D/A converter 40E as obtained when all the interlace/non-interlace setting switch 40B, two contacts of the erase on-off switch 40C and the erase number selection switch 40D are closed, namely, the output of the D/A converter 40E as obtained in the 8-times raster erase in the non-interlace mode. Thus, the output shown in FIG. 6 corresponds to the state of scanning lines as shown in FIG. 4(4).

As stated before, the terminals QA, QB and QC deliver, respectively, signals of frequencies obtained by demultiplying the frequency of the vertical synchronizing pulses V.SYNC into ½, ¼ and ⅛. These signals are fed to the D/A converter 40E through the interlace/non-interlace setting switch 40B, the erase on-off switch 40C and the erase number selection switch 40D. Upon receipt of these signals, the D/A converter 40E produces an analog signal to the vertical deflection circuit 20 through the variable resistor VR. The output of the D/A converter 40A has a waveform formed by summing the outputs from the counter 40A, as will be seen from FIG. 6.

Figure 7:
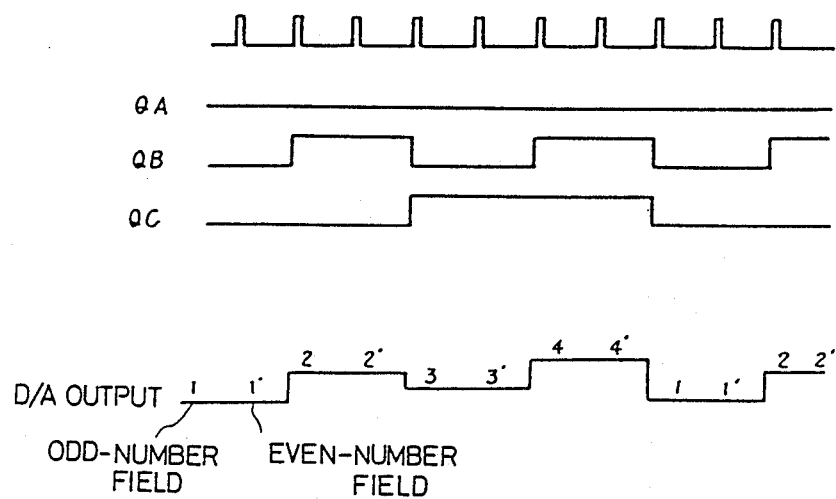
FIG. 7 is a diagram showing waveforms of signals obtained at various portions when raster erase is conducted with magnification 8 in interlace display mode.
Figure 8A:
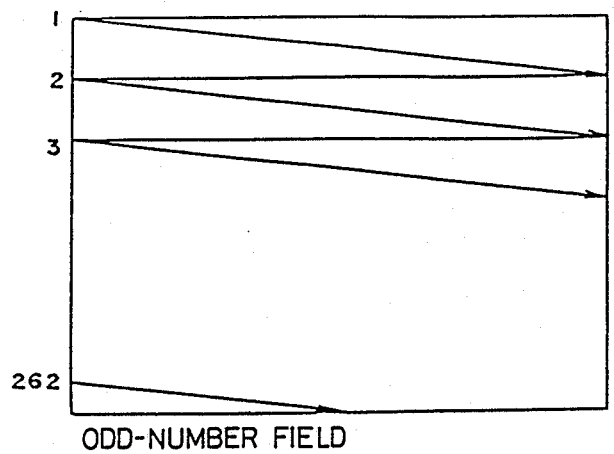
FIG. 8(B) is a diagram showing the movement of the scanning line of an even-number field.
Figure 8B:
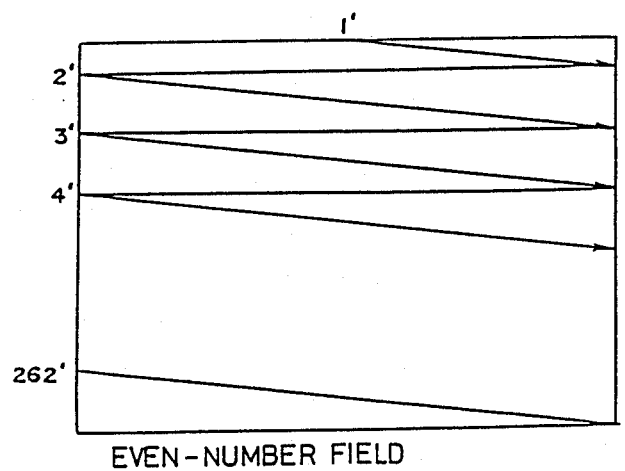

FIG. 7 shows the output from the variable resistor VR as obtained when 8-times raster erase is conducted in the interlace mode at a scanning rate of 524/60 Hz. This output corresponds to the state of the scanning lines shown in FIG. 4(7) mentioned before. In the case of the interlace mode, the interlace/non-interlace setting switch 40B has been turned off by the field detection circuit 22, so that the level of the signal output from the QA terminal of the counter 40A is always low, as shown in FIG. 7. In addition, since the raster erase is conducted with the multiplication factor of 8, the two contacts of the erase on-off switch 40C and the erase number selection switch 40D are in the on states, respectively. In consequence, the D/A converter 40E receives the signals obtained by demultiplying the vertical synchronizing pulses into ¼ and ⅛, the signals being derived from the QB terminal and the QC terminal of the counter 40A, respectively. In consequence, the D/A converter 40E outputs a signal which is formed by summing these two types of signals, as shown in FIG. 7. In this case, however, since there is a phase difference of H/2 in the synchronizing signals between an odd-number field and an even-number field, the scanning lines are changed on the actual display in the manners shown in FIGS. 8(A) and 8(B), respectively, when the present field is an odd-number field and when the present field is an even-number field, respectively.

Although the invention has been described through its specific forms, it is to be understood that the described embodiments are only illustrative and various changes and modifications may be imparted thereto without departing from the scope of the invention which is limited solely by the appended claims.

What is claimed is:

1. A controller for a CRT display apparatus which is capable of displaying, in accordance with an input image signal, an image selectively either in an interlace mode in which a vertical scanning is conducted in such a manner as to skip over every other scanning line or in a noninterlace mode in which the vertical scanning is conducted without skipping over any scanning line, and which is capable of displaying said image in a raster erase mode in which rasters are shifted vertically to scan the gaps between adjacent scanning lines, said controller comprising:

separation means for separating vertical synchronizing pulses and horizontal synchronizing pulses from said input image signal;

judging means for judging, on the basis of the separated vertical and horizontal synchronizing pulses, whether the present mode is the interlace mode or the noninterlace mode; and control means for allowing said CRT display apparatus to display the image of said input image signal in said raster erase mode which is changed so as to match with the interlace display mode or the non-interlace display mode switched over therebetween in accordance with the result of the judgment conducted by said judging means.

2. A controller for a CRT display apparatus according to claim 1, wherein said judging means includes a field detection circuit adapted to deliver different output signals depending on whether said input image signal is of an even-number field or an odd-number field, upon receipt of said vertical and horizontal synchronizing pulses.

3. A controller for a CRT display apparatus according to claim 2, wherein said field detection signal includes a PLL circuit for receiving said horizontal synchronizing pulses and for producing a signal produced by multiplying the frequency of said horizontal synchronizing pulses, a shift register having a clock terminal for receiving the output signal from said PLL circuit and terminals for receiving the horizontal synchronizing pulses, said shift register being adapted for outputting said horizontal synchronizing pulses after delaying said horizontal synchronizing pulses for a predetermined time, and a D-flip-flop having a D-terminal for receiving the output from said shift register and a clock terminal for receiving the vertical synchronizing pulses.

4. A controller for a CRT display apparatus according to claim 2, wherein said control means includes a mode setting circuit which is adapted to delay the separated vertical synchronizing pulses successively by a predetermined amount thereby effecting a raster erase.

5. A controller for a CRT display apparatus according to claim 2, wherein said control means includes a mode setting circuit which is adapted to delay the separated vertical synchronizing pulses in accordance with a predetermined sequence.

6. A controller for a CRT display apparatus according to claim 4, further comprising an erase on-off switch connected to said mode setting circuit and adapted for allowing the operator to select whether to conduct the raster erase, and an erase number selection switch connected to said erase on-off switch and adapted for allowing the operator to select the number of increase in the scanning lines.

7. A controller for a CRT display system according to claim 5, further comprising an erase on-off switch connected to said mode setting circuit and adapted for allowing the operator to select whether to conduct the raster erase, and an erase number selection switch connected to said erase on-off switch and adapted for allowing the operator to select the number of increase in the scanning lines.

8. A controller for a CRT display system according to claim 2, wherein said field detection circuit includes a first J-K-flip-flop, a second J-K-flip-flop and a monostable multivibrator.

9. A controller for a CRT display apparatus which is capable of displaying, in accordance with an input image signal, an image selectively either in an interlace display mode in which a vertical scanning is conducted in such a manner as to skip over every other scanning line or in a non-interlace display mode in which the vertical scanning is conducted without skipping over any scanning line, and which is capable of displaying said image in a raster erase mode in which rasters are shifted vertically to scan the gaps between adjacent scanning lines, said controller comprising:
  separation means for separating vertical synchronizing pulses and horizontal synchronizing pulses from said input image signal;
  a field detection circuit for judging, upon receipt of the separated vertical and horizontal synchronizing pulses, whether said image signal belongs to an even-number field or to an odd-number field; and
  control means for allowing said CRT display apparatus to display the image of said input image signal in said raster erase mode which is changed so as to match with the interlace display mode or the non-interlace display mode switched over therebetween in accordance with the result of the judgment conducted by said judging means.

10. A controller for a CRT display apparatus according to claim 9, further comprising a counter provided between said field detection circuit and said mode setting circuit and adapted to judge, upon receipt of the output of said field detection circuit, whether said image signal is of the interlace mode or the non-interlace mode.

11. A controller for a CRT display apparatus according to claim 10, wherein said field detection circuit includes a PLL circuit for receiving said horizontal synchronizing pulses and for producing a signal produced by multiplying the frequency of said horizontal synchronizing pulses, a shift register having a clock terminal for receiving the output signal from said PLL circuit and terminals for receiving the horizontal synchronizing pulses, said shift register being adapted for outputting said horizontal synchronizing pulses after delaying said horizontal synchronizing pulses for a predetermined time, and a D-flip-flop having a D-terminal for receiving the output from said shift register and a clock terminal for receiving the vertical synchronizing pulses and adapted for producing an output of different levels depending on whether said image signal belongs to an even-number field or to an odd-number field.

12. A controller for a CRT display apparatus according to claim 11, wherein said counter is adapted to judge whether the present mode is the interlace mode or the non-interlace mode, through counting the number of rise and fall of the level of the output signal of said D-flip-flop.

13. A controller for a CRT display apparatus according to claim 12, further comprising a change-over switch disposed between said counter and said mode setting circuit and switchable between a contact which allows the output of said counter to be automatically input to said mode setting circuit and a contact which enables the operator to manually select the display mode between the interlace mode and the non-interlace mode.

14. A controller for a CRT display apparatus according to claim 13, further comprising an erase on-off switch connected to said mode setting circuit and adapted for allowing the operator to select whether to conduct the raster erase, and an erase number selected switch connected to said erase on-off switch and adapted for allowing the operator to select the number of increase in the scanning lines.

15. A controller for a CRT display apparatus according to claim 12, wherein said field detection circuit includes a first J-K-flip-flop, a second J-K-flip-flop and a monostable multivibrator.

16. A controller for a CRT display apparatus according to claim 15, wherein said mode setting circuit includes a D/A converter.

* * * * *